(12) United States Patent
Starodubov

(10) Patent No.: US 6,310,998 B1
(45) Date of Patent: Oct. 30, 2001

(54) FABRICATION OF REFRACTIVE INDEX PATTERNS IN OPTICAL FIBERS HAVING PROTECTIVE OPTICAL COATINGS

(75) Inventor: Dmitry Starodubov, Los Angeles, CA (US)

(73) Assignee: D-Star Technologies, Inc., Manhattan Beach, CA (US)

( * ) Notice: Subject to any disclaimer, the term of this patent is extended or adjusted under 35 U.S.C. 154(b) by 0 days.

(21) Appl. No.: 09/815,969

(22) Filed: Mar. 22, 2001

Related U.S. Application Data

(62) Division of application No. 09/232,365, filed on Jan. 15, 1999, now Pat. No. 6,222,973.

(51) Int. Cl.[7] .................. G02B 6/22; G02B 6/34

(52) U.S. Cl. .................. 385/37; 385/128; 385/141

(58) Field of Search ................ 385/37, 126, 128, 385/141; 430/290

(56) References Cited

U.S. PATENT DOCUMENTS

| 5,620,495 | * | 4/1997 | Aspell et al. | 65/392 |
| 5,773,486 | * | 6/1998 | Chandross et al. | 522/33 |
| 6,069,988 | * | 5/2000 | Kokura et al. | 385/37 |

* cited by examiner

Primary Examiner—John D. Lee
Assistant Examiner—Sarah N. Song
(74) Attorney, Agent, or Firm—Fulwider Patton Lee & Utecht, LLP

(57) ABSTRACT

A refractive-index grating fabricated in an optical fiber having a multilayer coating and a method for making refractive-index patterns such as gratings in optical fibers such that the mechanical properties of the original fiber are preserved. The patterns are written into the optical fiber by partially stripping away the outer coating of the fiber, exposing the core of the fiber through the remainder of the coating with an actinic radiation to form the pattern in the photosensitive core of the fiber, followed by recoating the fiber in the stripped area to provide protection of the newly formed pattern from corruption and to preserve the mechanical properties of the fiber.

18 Claims, 1 Drawing Sheet

FABRICATION OF REFRACTIVE INDEX PATTERNS IN OPTICAL FIBERS HAVING PROTECTIVE OPTICAL COATINGS

This is a divisional application of Ser. No. 09/232,365 filed Jan. 15, 1999 now U.S. Pat. No. 6,222,973.

FIELD OF THE INVENTION

The present invention relates to optical media and, more particularly, to the fabrication of refractive index patterns such as gratings within optical fibers. A major objective of the invention is to provide for faster fabrication of refractive-index gratings in optical fibers, with less cost, and without significantly reducing the fiber's mechanical strength.

BACKGROUND OF THE INVENTION

Gratings in optical fibers are important structures for optical communications. For example, communications systems using wavelength division multiplexing require gratings to separate the various signals traveling through the optical fibers. Fiber gratings are also used to make sensors. Most fiber gratings are presently fabricated by exposing the core of the fiber to a UV light, having a wavelength around 240 nm, that causes a change in the refractive-index of the fiber's core. However, because the outer polymer coating of most optical fibers is not transparent to 240 nm light, the fiber's outer polymer coating must be removed before exposing the fiber core to the UV light to form the grating. The fiber must then be recoated to prevent damage to the glass fiber and to preserve the mechanical strength of the fiber. This recoating must be done in a timely manner because exposing the surface of a silica fiber to humidity and dirt can permanently weaken the fiber, and the mechanical strength of the once-exposed fiber can remain decreased even after the silica core is subsequently recovered with a coating material. The choice of recoating material is limited by the requirement that the recoating material must adhere well to silica and may need to form a hermetic seal to the fiber surface. Additionally, removing the fiber's polymer coating before UV light exposure and subsequently recoating the fiber with a polymer after the UV light exposure is time consuming and expensive.

Recently, new fiber coatings that are transparent to UV light at 257 nm have been used to coat optical fibers. These new fiber coating make it possible to fabricate fiber gratings without first having to strip the fiber of its coating. However, these fibers with their special coatings have several disadvantages. The transparency of the coating to UV light makes the fibers sensitive to the environment, since undesirable UV light from the environment can now reach the photosensitive fiber core, producing excess optical loss and, in extreme cases, even erasing the fabricated grating. Additionally, these coatings are especially soft and sticky, and can accumulate dust. This dust can adversely affect grating fabrication if the dust absorbs UV light during the fabrication process. Moreover, the polymer coating can also become damaged by excess heat, which can also distort the fiber grating in the fiber core.

An alternative approach for writing gratings in fibers without removing the fiber coating uses the sensitivity of the fiber core to light in the near-UV region of the spectrum, having a wavelength of approximately 330 nm. An advantage to using near-UV light instead of mid-UV light is that the polymer coating of standard optical communication fiber (such as Corning SMF 28, a product of Corning Incorporated, Corning, N.Y.) is somewhat transparent to near-UV light, but is not transparent to mid-UV light having a wavelength of approximately 240 nm. Because standard polymer coatings are transparent to light in this near-UV wavelength region, it becomes possible to fabricate gratings through standard coatings without the use of a special polymer coating. Standard fiber coatings also provide protection to the photosensitive fiber core from mid-UV light having wavelengths in the region of the spectrum where the fiber core has its highest photosensitivity, so that the problem of induced loss and grating erasure by UV light from the environment is reduced. However the problem of degradation of the polymer coating surface from dust and other environmental contaminants remains, because such dust can absorb UV light when the grating is written and distort the light pattern that forms the grating in the fiber core. Special measures to protect the phase mask from contamination with dust and possible exhaust from the polymer during UV exposure may also be required.

What has been needed, and heretofore unavailable is a faster, lower cost method for writing refractive index gratings into optical fiber that avoids the problems of damage or contamination of the coating and subsequent deterioration of the optical path needed to write the grating into the fiber core region. The resulting fiber must have high immunity to erasure or solarization and must retain a significant fraction of its original mechanical strength. The present invention fills this need.

SUMMARY OF THE INVENTION

Briefly and in general terms the present invention solves the problems of protecting the photosensitive fiber core from undesirable environmental UV exposure and shielding the optical polymer surface from degradation. This is accomplished by using a fiber having multiple coating layers. This multicoated fiber contains an inner coating layer that is mostly transparent to the writing light, and a "protective" coating layer over the inner "optical" layer to provide mechanical protection for the inner layer from dust and other contaminants, and optical protection of the photosensitive fiber core from undesired photo-darkening and solarization. The protective layer is easy to remove without significantly disturbing the inner layer. This removal of the protective layer can be accomplished by either mechanical or chemical means. The protective layer is removed primarily in the region where the optical writing exposure is executed, for example only around the region of the fiber where the grating will be written. Removal of the protective layer should be done immediately before writing with UV light so the outer surface of the inner layer will have no time to degrade or accumulate dust. After writing with UV light the protective layer and any other outer layers are then reformed in the regions where they were removed.

One key advantage of the new technique as compared to the standard stripping and recoating technique is that the silica glass of the fiber itself is never exposed to the environment so that the fiber retains a greater mechanical strength. Exposing the surface of a silica fiber to humidity and dirt can permanently weaken the fiber, and the mechanical strength of the once-exposed fiber can remain decreased even after the silica core is subsequently recovered with a coating material. Another advantage of the new technique is that the protective polymer does not necessarily have to adhere well to silica; the recoating process does not require hermetic sealing of the outermost coating to the fiber surface. The less stringent requirements for stripping and recoating simplify these processes so that time and expense can be saved.

One embodiment of the invention comprises a waveguide for processing with actinic radiation. The waveguide, in the form of an optical fiber, has a coating containing at least an inner layer and a separate protection layer. The inner layer may be at least half as transmissive as absorptive for actinic radiation, where the actinic radiation may have a wavelength longer than 220 nm although other wavelengths of actinic radiation may also be used. The core of the waveguide is sensitive to actinic radiation. The protective layer of the waveguide is removable either mechanically or chemically and can be removed without removing the inner layer.

The waveguide of this type allows for a method of processing the waveguide so as to affect the sensitive core. The method consists of removing the protective portion of the coating followed by exposure of the core to the actinic radiation through the remainder of the coating. This exposure can be uniform or non uniform along the waveguide. One purpose of exposing the waveguide and its sensitive core to the actinic radiation is to fabricate a grating structure within the waveguide. Many different types of patterns or gratings may be produced within the core of the waveguide. Examples of such gratings include Bragg gratings and long-period gratings. The method can be used to produce long period gratings covering a range of average periods in the range of 10 to 2000 microns.

The method also includes the recoating of the waveguide with a protective layer after its exposure to actinic radiation. This protective layer should be at least half as absorptive as transmissive for the actinic radiation. The protective layer is typically a polymer, which may be a polymethacrylate, silicone resin or any other appropriate material including, aliphatic polyacrylates, silesesquioxanes, alkyl-substituted silicones or vinyl ethers.

The actinic radiation is typically Ultra-Violet radiation in the region 220–390 nm, although other wavelengths of actinic radiation may also be used. The method can also include preloading the waveguide before exposure to UV light with hydrogen (or its isotope deuterium) to increase the photosensitivity of the core to the UV light.

Another embodiment of the invention includes a refractive index grating formed within the core region of an optical fiber by exposure of the fiber core to actinic radiation. The grating containing fiber has a mechanical breaking strength of not less than 50% of the same fiber prior to processing the fiber to fabricate the grating. It is anticipated that the breaking strength could actually be 90% or more of the strength of the original fiber. The optical fiber used in fabrication of the grating is the same as previously discussed, having an inner layer and a separate protective layer, with the protective layer being removed prior to creation of the grating, then replaced with a new protective layer in the region containing the grating.

Other features and advantages of the invention will become apparent from the following detailed description taken in conjunction with the accompanying drawings, which illustrate, by way of example, the features of the invention.

DETAILED DESCRIPTION OF THE PREFERRED EMBODIMENTS

As shown in the exemplary drawings, the present invention relates to optical media and, more particularly, to the fabrication of refractive index patterns such as gratings within optical fibers. The present invention provides for faster, less costly fabrication of refractive-index gratings in optical fibers, without significantly reducing the fiber's mechanical strength. The grating formed in such an optical fiber can be of any pattern formable by exposure of a photosensitive fiber core to actinic radiation to provide regions of varying refractivity withing the core of the fiber. For example, the grating could be a Bragg grating or a long-period grating, two types of gratings currently in general use.

Figure 1:
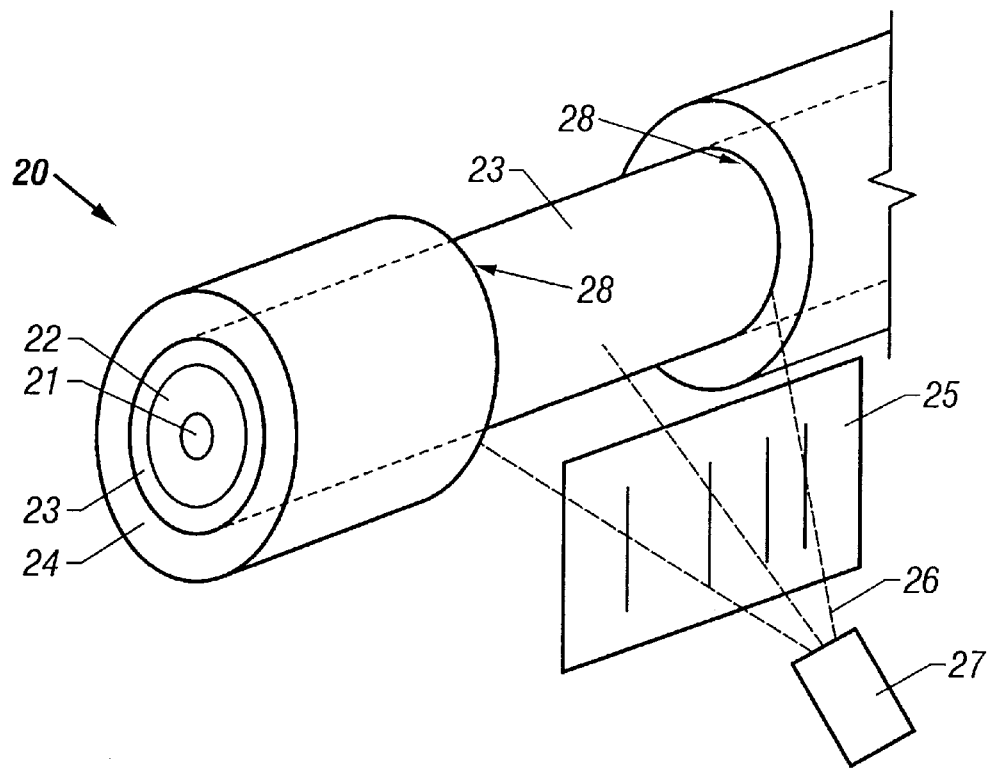
FIG. 1 is a schematic view of an embodiment of the present invention showing an optical fiber having a removable protective layer and a transparent inner coating layer.

One embodiment of an optical fiber incorporating the present invention is depicted in FIG. 1. The optical fiber 20 consists of a core region 21 surrounded by a cladding layer 22 that is itself surrounded by an outer coating. The core 21 of the fiber is doped to be optically reactive to certain wavelengths of an actinic radiation typically Ultra-Violet light greater than 220 nm although other wavelengths of actinic radiation may be used as needed to produce the effect desired in the core 21 of the fiber 20. In some cases the core of the fiber can be loaded with hydrogen (or its isotope deuterium) to increase the photosensitivity of the core to UV light. Typical loading conditions are 4000 psi of $H_2$ at 30°–100° C. for 1–6 days.

The coating layer of the preferred embodiment is a multilayer coating having with at least two layers, a protective layer 24, and an inner layer 23 that is typically bonded to the fiber cladding layer 22. The inner coating layer 23 should be more transparent than absorptive of the actinic radiation used to write the grating into the fiber core 21. Since the actinic radiation used to form gratings in fiber optic cores is usually UV light having a wavelength longer than 220 nm, the inner coating layer 23 must transmit a greater percentage of the UV light in this wavelength than the layer 23 absorbs. Moreover, it is preferable that the layer 23 be more transparent than absorbing to near-UV radiation having a wavelength in the 275 nm–385 nm range. One source for the actinic radiation may be light having a wavelength around 257 nm produced by a frequency doubled Argon laser, although other sources of light having the desired wavelengths are well know by those skilled in the art.

The refraction index of the inner coating layer 22 may be selected to be greater than, less than or the same as the refraction index of the adjacent cladding layer 22, depending on the requirements of the grating pattern to be fabricated. In a preferred embodiment, the inner coating layer 23 may be formed from a polyacrylic or a silicone resin, although other materials, such as aliphatic polyacrylates, silesesquioxanes, alkyl-substituted silicones or vinyl ethers may also be used.

The protective layer 24 protects the outer surface of inner layer 23 from dust or other contaminants, and is preferably easy to remove from the inner layer 23 without significant damage to the inner layer 23. Ease of removal of the protective layer 24 may be enhanced by selecting a material for the protective layer 24 that has different mechanical properties or different chemical properties than the inner layer 23.

Inner layer 23 in turn protects the surface of the fiber glass cladding 22 from environmental factors when the protective layer 24 is removed, such as humidity and dirt which can reduce the strength of the fiber. While inner layer 23 is transparent to the actinic radiation used to write the grating into the fiber, the protective layer 24 is formed from a material that is absorptive or reflective of the spectrum of radiation to which the fiber core 21 is photosensitive. The absorptive or reflective property of the protective layer 24 protects the fiber core 21 from the effects of ambient environmental radiation when the fiber is used. This protection prevents corruption or erasure of the grating by solarization. Moreover, since only a portion of the protective layer 24 is removed during formation of the grating, as depicted by removed area 28 in FIG. 1, the protective layer 24 prevents corruption or changes in areas of the fiber core 21 that are outside of the desired location of the grating.

Figure 2:
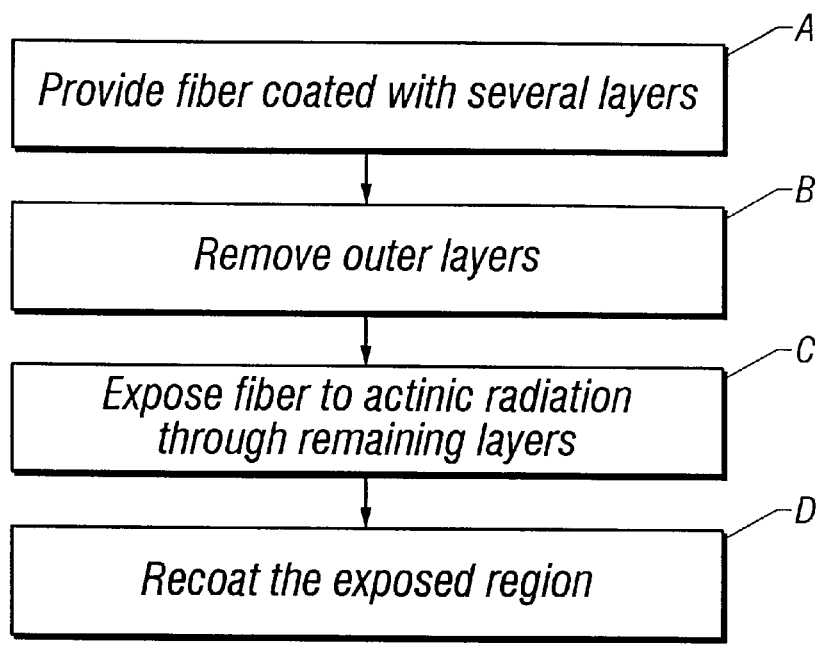
FIG. 2 is a flow diagram, essentially in block form, of a process for forming a fiber grating in the optical fiber of FIG. 1.

Referring now to FIGS. 1 and 2, a method of forming a grating in an optical fiber incorporating the present invention will be described. Typically, a grating is formed by exposing a portion of the core layer 21 of an optical fiber to actinic radiation having a wavelength to which the material forming the core layer 21 is photosensitive. The protective layer 24 is removed from the inner layer 23 in a selected region 28 of the optical fiber 20 where the grating is to be located. Removal can be either complete or sufficient to a. Removing the protective layer 24 in region 28 exposes the inner layer 23. Preferably, the protective layer 24 is removed just prior to writing the grating so that the quality of the outer surface of inner layer 23 will be preserved by protective layer 24 during all preliminary stages of fiber processing and handling including any hydrogen loading of the fiber core 21 or cladding layer 22.

When the protective layer 24 has been stripped from region 28, actinic radiation 26 from light source 27 is directed towards the optical fiber 20 through a mask 25 to form a periodic pattern in the fiber core 21. Since the protective layer 24 absorbs or reflects the wavelengths of the actinic radiation 26 produced by light source 27, the only portion of the fiber core 21 that is exposed to the actinic radiation 26 is the area of the fiber core 21 that lies under the inner layer 23 that is exposed in region 28. As previously discussed, the inner layer 23 is formed from a material that is more transparent than absorbent to the actinic radiation 26, thus ensuring that actinic radiation passing through the mask 25 is transmitted through the inner layer 23 and into the core 21 and cladding 22 of the optical fiber 20.

After the grating is formed in the core 21 of the optical fiber 20, the inner layer 23 is preferably recoated to reform the protective layer 24 in the exposed region 28 so that the previously exposed region 28 has the same mechanical and light absorbing or reflecting properties as the adjacent unstripped regions of the fiber. One additional benefit of the preferred invention is that the recoating of exposed region 28 is simpler and easier to perform than prior art methods because the cladding layer 22 of the optical fiber 20 is already coated with the inner layer 23, and the material used to recoat and reform the protective layer 24 in region 28 need only to adhere to the inner layer 23 and not to the silica glass of the core 21 or cladding layer 22.

The fiber can be annealed with heat after writing the grating to stabilize the grating. Annealing can also be used to change the properties of the coating, for example, increasing the coating's absorption in the UV range to protect the photosensitive fiber core or to increase the mechanical strength of the coating. In some cases, annealing may make recoating of the fiber unnecessary.

The following examples are provided to illustrate two possible methods for the forming of gratings with partial removal of the protective layer 24. These examples are provided as illustrations only and are not intended to limit the scope of the disclosed invention.

EXAMPLE 1

An optical fiber having a core and a cladding layer is coated with UV transparent methylsilsesquioxane to an outer diameter of 170 microns. The fiber, now comprising a core, cladding layer and the transparent layer of methylsilsesquioxane is then coated with a layer of UV absorbing polyvinyl to an outer diameter of approximately 800 microns. After the coating is completed, the optical fiber may be loaded with deuterium to increase the photosensitivity of the fiber core to UV light.

A grating is formed in the optical fiber at a desired location by mechanically stripping the polyvinyl coating layer from the transparent methylsilsesquioxane layer, and the fiber core is exposed to 257 nm UV light from a frequency-doubled Argon laser through a phase mask. The UV light passes through the fiber's transparent methylsilsesquioxane layer to reach the cladding and core. A Bragg grating having 3 dB reflection at 1550 nm forms in the fiber's core after exposing the core through the transparent methylsilsesquioxane layer for 5 minutes with 40 mW of 257 nm continuous-wave actinic radiation. After exposure of the fiber to the actinic radiation, the length of the fiber optic containing the grating is annealed for 2 days at 90° C. in an oven. When the portion of the fiber optic contain the grating has been suitably annealed, the stripped portion of the fiber optic is recoated with the protective polyvinyl outer coating.

EXAMPLE 2

An optical fiber having a core that is co-doped with boron and germanium and a cladding layer is coated with a UV transparent inner layer formed from a silicone resin to an outer diameter of 190 microns. The coated optical fiber is then coated with a nitrocellulose-based protective layer to form an completed optical fiber with an outer diameter of 250 microns. A grating is formed by dissolving a portion of the protective layer in acetone where the grating is to be located, and then illuminating the exposed silicone resin layer through a phase mask with near-UV actinic radiation having a wavelength of 334 nm from a UV-Argon laser. A Bragg grating with 10% reflection forms in the fiber core as a result of the near-UV exposure. The fiber is then annealed at 200° C. for 2 minutes. The exposed silicone resin region of the fiber is then recoated by dipping the exposed region of the fiber into a nitrocellulose solution and subsequently evaporating the solvent.

From the foregoing, it will be appreciated that the disclosed optical fiber with multilayer coating and the disclosed method for creating refractive index patterns in the core of the optical fiber through the inner coating of the fiber provide a faster, lower cost method for writing refractive gratings into optical fiber. It provides these advantages without the incurring the problems of the prior art methods of grating formation by preventing contamination of the core region with dust or allowing corruption or erasure of the grating by environmental light to which the core is photosensitive. The resulting optical fiber, containing the refractive index pattern, retains a high immunity from erasure or solarization and retains a significant part of its original mechanical strength.

While particular forms of the invention have been illustrated and described, it will be apparent that various modifications can be made without departing from the spirit and scope of the invention. Accordingly, it is not intended that the invention be limited, except as by the appended claims.

What is claimed is:

1. A fiber optic refractive index grating formed in an optical fiber, comprising:

an optical fiber having a core region surrounded by a cladding layer, the core region being sensitive to actinic radiation;

a coating surrounding the cladding layer, the coating having at least an inner layer and a protective layer, the inner layer being at least partially transparent to actinic radiation and the protective layer being substantially non-transparent to actinic radiation;

a pattern of varying refractive indexes formed in a selected portion of the core region of the optical fiber.

2. The fiber optic refractive index grating of claim 1, wherein the portion of the core region having the pattern has a mechanical breaking strength greater than 50% of the mechanical breaking strength of the remainder of the optical fiber.

3. The fiber optic refractive index grating of claim 1, wherein the portion of the core region having the pattern has a mechanical breaking strength at least 90% of the mechanical breaking strength of the remainder of the optical fiber.

4. The refractive index grating of claim 1, wherein the grating is a Bragg grating.

5. The refractive index grating of claim 1, wherein the grating is a long period grating.

6. The refractive index grating of claim 5, wherein the grating has an average grating period within the range of 10 microns to 2000 microns.

7. The refractive index grating of claim 5, wherein the refractive index of the inner layer is less than the refractive index of the cladding layer.

8. A fiber optic refractive index grating formed in an optical fiber, comprising:

an optical fiber having a transmitting region including a core surrounded by a cladding layer, at least a portion of the transmitting region being sensitive to actinic radiation;

a coating surrounding the cladding layer, the coating having at least an inner layer and a protective layer, the inner layer being at least partially transparent to actinic radiation and the protective layer being substantially non-transparent to actinic radiation;

a pattern of varying refractive indexes formed in a selected portion of the transmitting region of the optical fiber.

9. The fiber optic refractive index grating of claim 8, wherein the portion of the transmitting region having the pattern has a mechanical breaking strength greater than 50% of the mechanical breaking strength of the remainder of the optical fiber.

10. The fiber optic refractive index grating of claim 9, wherein the portion of the transmitting region having the pattern is the core.

11. The fiber optic refractive index grating of claim 8, wherein the portion of the transmitting region having the pattern has a mechanical breaking strength at least 90% of the mechanical breaking strength of the remainder of the optical fiber.

12. The fiber optic refractive index grating of claim 11, wherein the portion of the transmitting region having the pattern is the core.

13. The refractive index grating of claim 8, wherein the grating is a Bragg grating.

14. The refractive index grating of claim 8, wherein the grating is a long period grating.

15. The refractive index grating of claim 14, wherein the grating has an average grating period within the range of 10 microns to 2000 microns.

16. The refractive index grating of claim 14, wherein the refractive index of the inner layer is less than the refractive index of the cladding layer.

17. The fiber optic refractive index grating of claim 8, wherein the portion of the transmitting region having the pattern is the core.

18. The fiber optic refractive index grating of claim 8, wherein the portion of the transmitting region having the pattern is the cladding layer.

* * * * *